United States Patent [19]
Otis

[11] Patent Number: 5,536,058
[45] Date of Patent: Jul. 16, 1996

[54] TELESCOPING TAILGATE RAMP

[76] Inventor: Ronald T. Otis, 6926-55th St. NE., Marysville, Wash. 98270

[21] Appl. No.: 401,145

[22] Filed: Mar. 8, 1995

[51] Int. Cl.⁶ ................................................. B62D 33/03
[52] U.S. Cl. ........................................... 296/61; 414/537
[58] Field of Search ............................. 296/61; 414/537

[56] References Cited

U.S. PATENT DOCUMENTS

| | | |
|---|---|---|
| 3,642,156 | 2/1972 | Stenson . |
| 3,713,553 | 1/1973 | Curtis et al. . |
| 3,756,440 | 9/1973 | Raap et al. . |
| 4,003,483 | 1/1977 | Fulten ................................ 246/61 X |
| 4,601,632 | 7/1986 | Agee . |
| 4,668,002 | 5/1987 | Hanson . |
| 4,735,454 | 4/1988 | Bernard . |
| 4,864,673 | 9/1989 | Adaway et al. . |
| 5,244,335 | 9/1993 | Johns ................................... 296/61 X |
| 5,312,149 | 5/1994 | Boone . |

Primary Examiner—Joseph D. Pape
Attorney, Agent, or Firm—Graybeal Jackson Haley & Johnson

[57] ABSTRACT

The present invention relates to tailgate ramp for mounting on a truck, comprising a frame defining an internal space, the frame having a top, bottom, left side and right side; a hinge assembly for pivotally mounting the frame to the vehicle, the frame movable between an up position and a down position; a latch assembly mounted to the frame and the vehicle for selectively securing the frame in the up position; at least one axle; vertical sliding rollers mounted to the at least one axle for permitting movement of the at least one axle within the internal space between the top and bottom of the frame; at least one ramp member adapted to support a second vehicle thereon, the at least one ramp member having a base member and at least one telescoping member slidably disposed within the base member between an extended position and a fully retracted position, wherein the at least one ramp member is dimensioned to be completely disposed within the internal space in the frame when at least one telescoping member is in the fully retracted position; a pair of sleeves slidably disposed on the on the at least one axle and mounted to the base member of the at least one ramp member for permitting movement of the at least one ramp member between the left and rights sides of the frame.

21 Claims, 6 Drawing Sheets

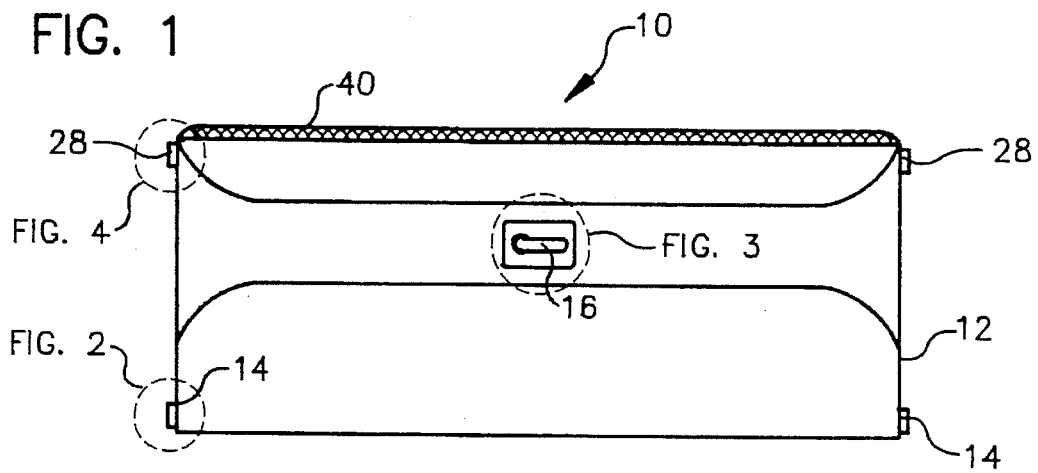
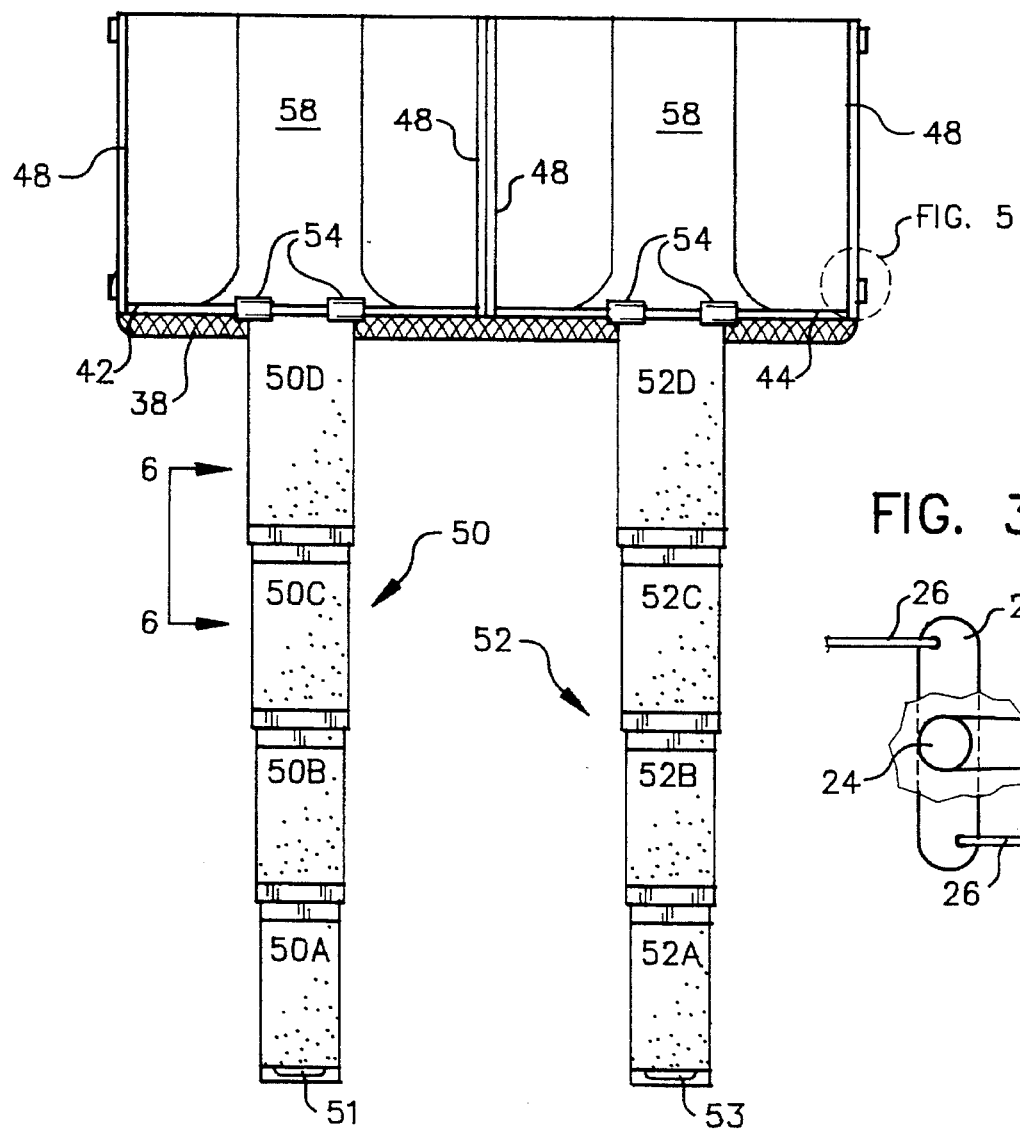
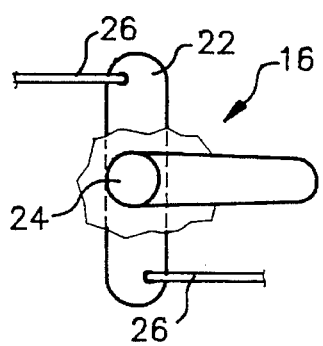

5,536,058

TELESCOPING TAILGATE RAMP

BACKGROUND OF THE INVENTION

The present invention relates to tailgate ramps for trucks, and more particularly, the present invention relates to a tailgate ramp having telescopically extending ramps which are stowed in pockets within the tailgate.

DESCRIPTION OF THE PRIOR ART

Various different forms of pivoted, folding and sliding loading ramps have been associated with the rear ends of truck type vehicles and include ramp structures which have been supported entirely or in part from the tailgate of a pickup truck-type vehicle.

Examples of these previously known forms of ramps or ramp structures are disclosed in U.S. Pat. Nos. 2,783,080, 3,642,165, 4,944,546, 5,133,584 and 5,312,149. However, those structures have not been of a type wherein both the length and the width of the ramp structure can be readily adjusted to accommodate various road surfaces and vehicles of differing dimensions.

SUMMARY OF THE INVENTION

The present invention relates to tailgate ramp for mounting on a truck, comprising a frame defining an internal space, the frame having a top, bottom, left side and right side. A hinge assembly pivotally mounts the frame to the vehicle and the frame is movable between an up position and a down position. A latch assembly is mounted to the frame and the vehicle for selectively securing the frame in the up position. Vertical sliding rollers are mounted to at least one axle for permitting movement of the axle within the internal space between the top and bottom of the frame. At least one ramp member is adapted to support a second vehicle thereon. The ramp member has a base member and at least one telescoping member slidably disposed within the base member between an extended position and a fully retracted position. The ramp member is dimensioned to be completely disposed within the internal space in the frame when the telescoping member is in the fully retracted position. A pair of sleeves are slidably disposed on the axle and are mounted to the base member of the ramp member for permitting movement of the ramp member between the left and right sides of the frame. In one embodiment, two ramp members are present and one of the ramp members has a width which increases with distance from the tailgate and the other ramp member has a width which decreases with distance from the tailgate such that the two ramp members, when joined, form a rectangular ramp. In another embodiment, the ramp member is pivotally attached to the tailgate ramp.

Accordingly, it is an object of the present invention to provide a tailgate ramp which can be fully retracted into the truck body when stored.

Another object of the present invention is to provide a tailgate ramp having a width which is adjustable so as to accommodate vehicles of varying dimensions.

Yet another object is to provide two or more telescoping ramp members which, when joined, form a substantially rectangular ramp.

Yet another object is to provide ramps that are adjustable vertically to accommodate varying altitudes of various terrains, such as hills, loading docks, porches, etc.

An additional object is to provide ramp members which both pivot and telescope to reduce the number of telescoping segments which are employed.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

FIRST EMBODIMENT

| | |
|---|---|
| 10-ramp frame | 12-frame |
| 14-hinge assemblies | 16-handle |
| 18-pivot pin | 20-bearing bracket |
| 21-truck body | 22-cross member |
| 24-pivot post | 26-cables |
| 28-latch assembly | 30-latch pin |
| 32-housing | 34-spring |
| 36-latch recess | 38-cap plate |
| | 40-hinge |
| 42-left axle | 44-right axle |
| 46-rollers | 47-washer |
| 48-slide channels | 50-left ramp |
| 50A-first left member | 50B-second left member |
| 50C-third left member | 50D-fourth left member |
| 51-handle | 52-right ramp |
| 52A-first right member | 52B-second right member |
| 52C-third right member | 52D-fourth right member |
| 53-handle | 54-ramp slide |
| 56-slide stops | 58-ramp pockets |

SECOND EMBODIMENT

| | |
|---|---|
| 110-ramp frame | 140-axle |
| 150-left ramp | 150A-first left member |
| 150B-second left member | 150C-third left member |
| 150D-fourth left member | 151-handle |
| 152-right ramp | 152A-first right member |
| 152B-second right member | 152C-third right member |
| 152D-fourth right member | 153-handle |
| 160-latch arm | 161-hole |
| 162-push button | |

THIRD EMBODIMENT

| | |
|---|---|
| 210-ramp frame | 211-truck body |
| 212-pivot arm | 214-sleeve |
| 216-tailgate | 217-frame pin |
| 218-catch sleeve | 220-catch pin |
| 222-catch latch | 224-left ramp |
| 224A-first left member | 224B-second left member |
| 225-pull handle | 226-right ramp |
| 226A-first right member | 226B-second right member |
| 227-slide | 228-latch arm |
| 229-slide guide | 230-opening |
| 232-push button lock | 233-spring biased button |
| 234-hinge | 236-tailgate cover |
| 238-support cable | 240-slide stop |

BRIEF DESCRIPTION OF THE DRAWINGS

FIG. 1 is a perspective view of a tailgate ramp constructed in accordance with a preferred embodiment of the present invention in an up position;

FIG. 1A is a perspective view of the tailgate ramp of FIG. 1 illustrating the tailgate ramp in a down position with ramps extended;

FIG. 3 a partial view of the tailgate ramp of FIG. 1 illustrating the handle;

DETAILED DESCRIPTION OF THE PREFERRED EMBODIMENT

Figure 2:
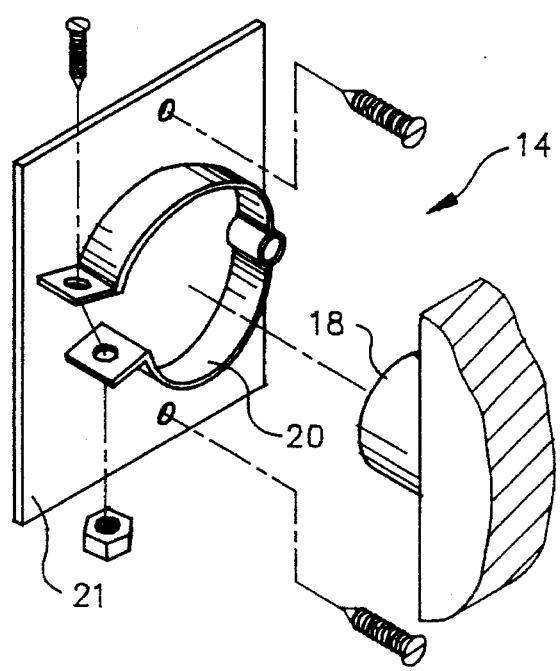
FIG. 2 is a partial view of the tailgate ramp of FIG. 1 illustrating the hinge assembly.

Referring to FIG. 1, ramp frame 10 is shown. Ramp 10 is preferably constructed from a metallic material and includes a hollow frame 12. Frame 12 includes is pivotally connected to pickup truck bed, not shown, by a pair of hinge assemblies 4 as best seen in FIG. 2. Hinge assemblies 4 are mounted on either side of the frame 2 and include a pivot pin 18 adapted to rotate within a bearing bracket 20 mounted to the truck body 21 by fastening means known in the art, such as screws, bolts and nuts.

Figure 4:
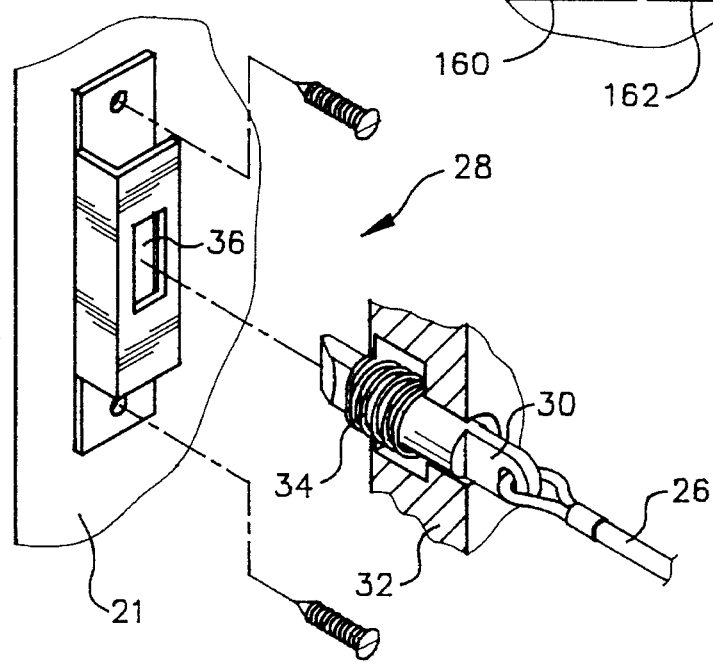
FIG. 4 a partial view of the tailgate ramp of FIG. 1 illustrating the latch assembly.

Referring now to FIG. 3 in conjunction with FIG. 1, a handle 16 is pivotally mounted on the frame 2 by a pivot post 24. Handle 16 includes a cross member 22 secured at opposite ends to first ends of cables 26. Referring to FIG. 4, cables 26 are attached at second ends to the latch pins 30 of latch assemblies 28. Latch pin 30 is slidably disposed through a housing 32 and is biased into a recess 36 in the truck body 21 by a spring 34 disposed within the housing 32. Referring to FIGS. 1, 3 and 4, handle 6 when rotated in a clockwise direction pulls cables 26 in a direction way from the recesses 36 in the truck body 21. The force of cables 26 on the latch pins 30 overcomes the force of the springs 34 allowing the latch pins 30 to slide out from within the recesses 36 and permitting the ramp frame 10 to be lowered.

Figure 6:
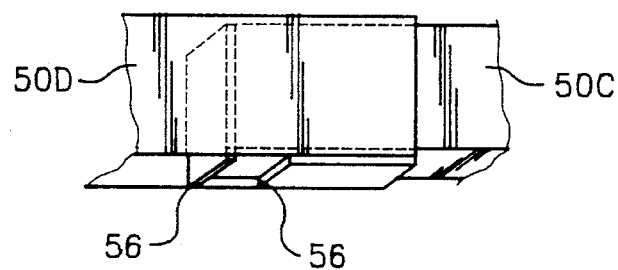
FIG. 6 is a partial view of the tailgate ramp of FIG. 1 illustrating the slide stops.
Figure 5:
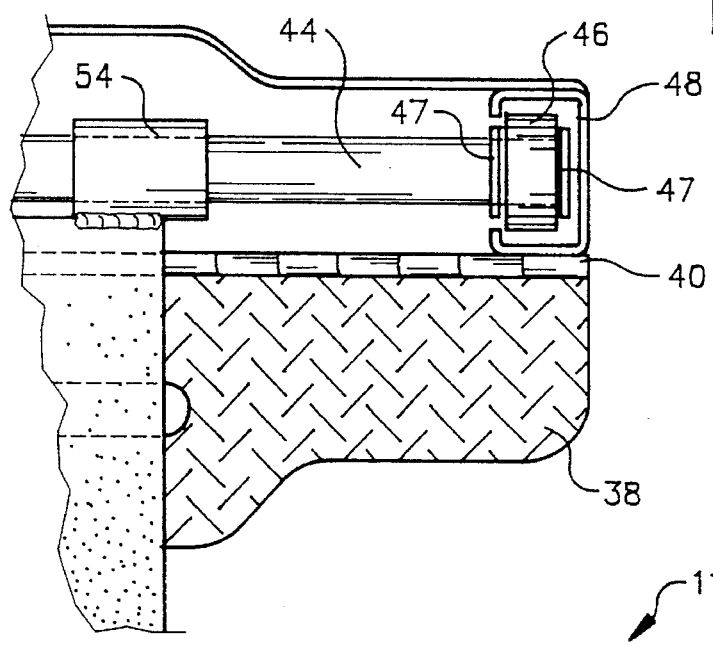
FIG. 5 is partial view of the tailgate ramp of FIG. 1 illustrating the right axle.

Referring to FIG. 5 in conjunction with FIGS. 1 and 1A, a cap plate 38 is pivotally mounted to the top of the frame by hinge 40. Cap plate 38 is provided to shield the internal space within the frame 12 when the frame is in the "up" position shown in FIG. 1. When the frame 12 is rotated into a "down" position as shown in FIG. 5, the cap plate can be rotated to an open position shown in FIG. 5 and thereby exposing the internal space within the frame Referring to FIGS. 1A and 5, a pair of axles, left axle 42 and right axle 44, are disposed within the frame Rotatably mounted to both ends of each axle 42 and 44 are rollers 46 secured between washers 47. Rollers 46 are slidably disposed within slide channels 48 formed in the frame 12 permitting vertical movement of axles 42 and 44 across the width of frame 2 for configuration of the ramp members (discussed below) in both storage and use positions. Respectively attached to each axle 42 and 44, are left ramp and right ramp 52. Left ramp 50 and right ramp 52 are constructed of, for example, four telescoping members of increasing sizes. Left ramp 50 includes a first left member 50A defining a hole forming a handle 5. First left member 50A is slidably secured to a second left member 50B, which in turn is slidably secured to a third left member 50C, which in turn is slidably secured to fourth left member 50D. Fourth left member 50D is mounted to a pair of ramp slides 54 slidably disposed on the left axle 42 permitting horizontal movement of the left ramp 50 along the left axle 42. Similarly, right ramp 52 includes a first right member 52A defining a hole forming a handle 53. First right member 52A is slidably secured to a second right member 52B, which in turn is slidably secured to a third right member 52C, which in turn is slidably secured to fourth right member 52D. Fourth right member 52D is mounted to a pair of ramp slides 54 slidably disposed on the right axle 44 permitting horizontal movement of the right ramp 52 along the right axle 44. The movement of left ramp 50 along left axle 42 and right ramp 52 along right axle 44 allows left ramp 50 and right ramp 52 to be separately positioned along the length of frame 12 to accommodate vehicles of varying wheel bases, or to form a single ramp. The substantially circular cross-section of left axle 42 and right axle 44 and that of ramp slides 54 allow left ramp 50 and right ramp 52 to pivot in a vertical plane substantially perpendicular to the substantially horizontal bed of the truck. In this manner, the relative angle of declination of left ramp 50 and right ramp 52 with respect to the horizontal truck bed is variable in order to accommodate loading from raised or lowered ground levels such as loading docks, porches, hills and ditches. Note that in this embodiment, as well as embodiment two below, the left ramp 50 (or 150) and the right ramp 52 (or 152) can either be located on two separate axles 42 and 44, or one single axle which provides for movement of both left ramp 50 (150) and right ramp 52 (152) along the entire length of frame Referring to FIG. 6, slide stops 56 are secured to members of left and right ramps 50 and 52, for example, on the outboard end of member 50D and the inboard end of member 50C, as shown to prevent separation of members from one another. Referring to FIG. 1A, the ramps 50 and 52 are adapted to be stowed within ramp pockets 58 in the frame 12 when not in use. In order to fit within the ramp pockets 58, the members of left and right ramps 50 and 52 are configured to recess into one another.

Figure 8:
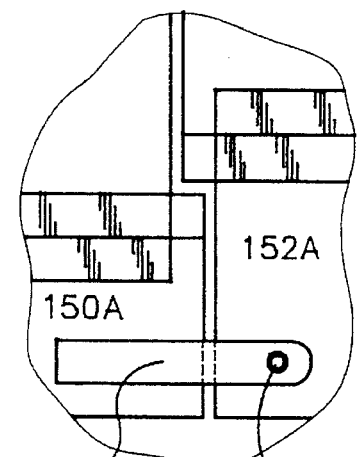
FIG. 8 is a partial view of the tailgate ramp of FIG. 7 illustrating the latch arm.
Figure 7:
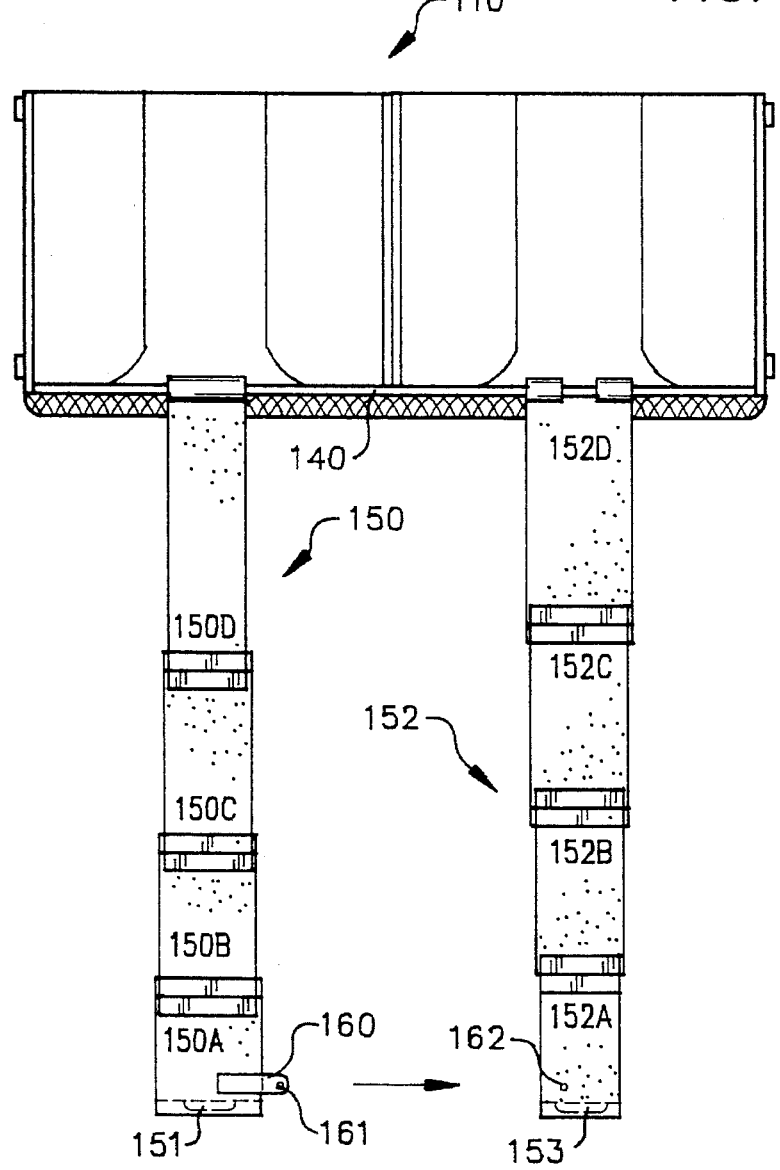
FIG. 7 is a perspective view of a tailgate ramp constructed in accordance with second preferred embodiment of the present invention.

Referring to FIG. 7, a second embodiment of the present invention is shown in the form of ramp frame 10. Ramp 0 is very similar to that of ramp 10, however ramp 110 includes a single axle 140 (but may also include two separate axles, as in the first embodiment, above). Mounted to the axle 140 are telescoping ramps 150 and 152. Left ramp 50 has an inverted design wherein first left member 150A is larger than second left member 150B, which in turn is larger than third left member 150C which in turn is larger than fourth left member 150D. Right ramp 152 includes members 152A, 152B, 152C, and 152D, the members being progressively larger from first right member 152A through fourth right member 152D. The staggering of the sizes of the members of left and right ramps 50 and 152 permit the ramps to be slid together in interlocking form to form a substantially rectangular single ramp shown in FIG. 8. A latch arm 160 having a hole 161 is attached to first left member 150A, the hole dimensioned to receive a push button 162 mounted on first right member 152A. The latch arm 160 provided to selectively secure the left ramp 150 to the right ramp 152. Apart from the differences noted above, the second embodiment of the present invention functions substantially identically to the above first embodiment of the present invention, and the detailed description of the first embodiment is expressly incorporated herein.

Figure 9:
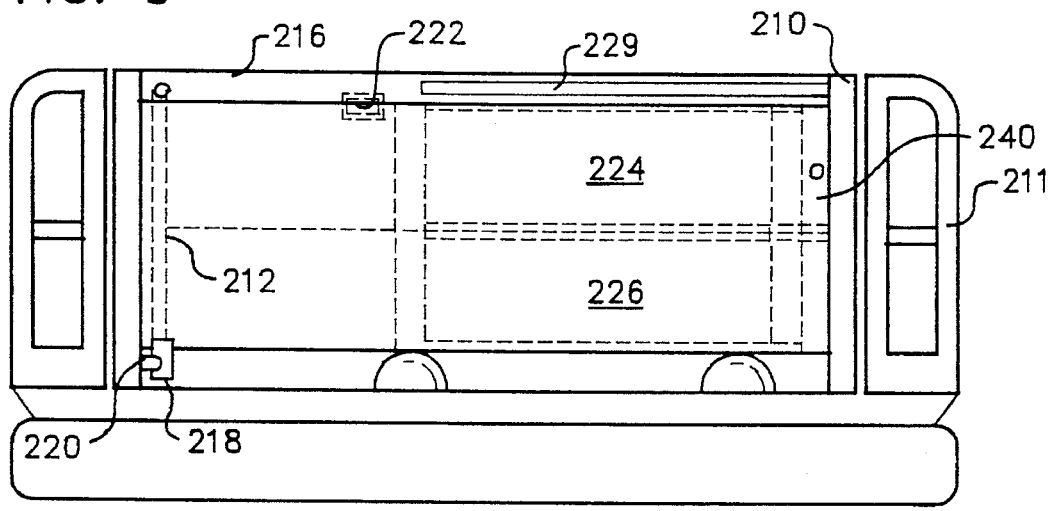
FIG. 9 is rear elevational view of tailgate ramp constructed in accordance with a third embodiment of the present invention.
Figure 10:
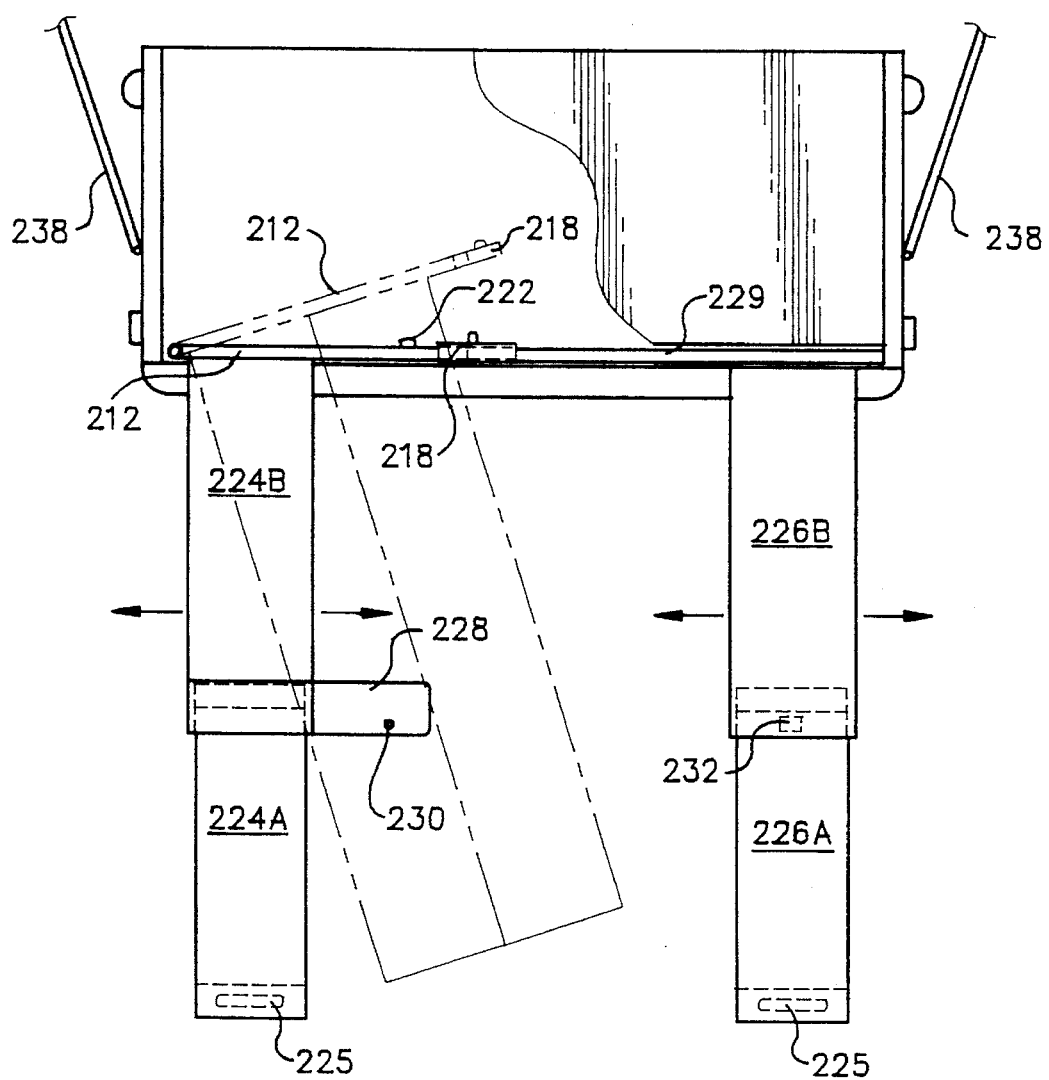
FIG. 10 is a view similar to that of FIG. 9 illustrating the tailgate ramp with ramps extended therefrom.
Figure 11:
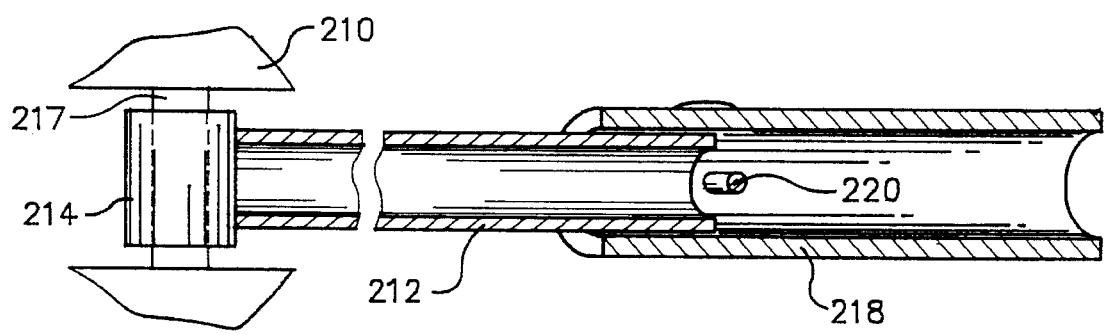
FIG. 11 is partial view of the pivot arm of the tailgate ramp of FIG. 9.
Figure 16:
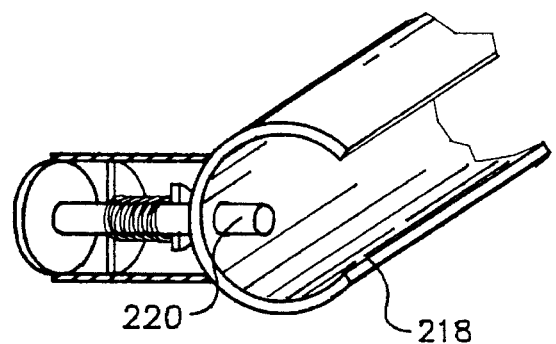
FIG. 16 is partial view of the catch sleeve of the tailgate ramp of FIG. 9.

Referring to FIGS. 9 and 10, a third embodiment of the present invention is shown in the form of ramp frame 210 of tailgate 216 attached to truck body 211. Ramp frame 210 incorporates two ramp members 224 and 226 which pivot outwardly from ramp frame 210 and then are extended. Referring to FIG. 11 in conjunction with FIGS. 9 and 10, a pivot arm 212 is pivotally connected at one end to one side of the ramp frame 210 by sleeve 214, which is pivotally attached to frame pin 217 of ramp frame 210. Pivot arm 212 is fixedly attached at its opposite end with catch sleeve 218. Catch sleeve 218 extends beyond the end of the pivot arm 212 and connects pivot arm 212 and slide guide 229 along the outer longitudinal edge of ramp frame 210 when the ramp of the present invention is in use. Catch sleeve 218 is configured with a catch pin 220 designed to prevent left ramp 224 and right ramp 226 from sliding out of pivot arm 212 while the ramps are stowed. The catch pin 220 is spring biased to be pushed out of the way of slide 227 (FIGS. 14 and 16) by slide guide 229 when the pivot arm 212 and the slide guide 229 meet and a portion of slide guide 229 nests within C-shaped catch sleeve 218.

Figure 12:
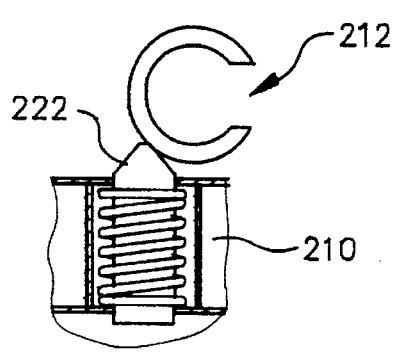
FIG. 12 is partial view of the catch latch of the tailgate ramp of FIG. 9.

Referring now to FIG. 12 in conjunction with FIGS. 9 and 10, catch latch 222 is illustrated. Catch latch 222 is a spring type latch located near the outer longitudinal edge of ramp frame 210 that retracts into ramp frame 210 allowing the pivot arm 212 to pass over catch latch 222 and then extends through ramp frame 210 to lock the pivot arm 212 along the outer longitudinal edge of ramp frame 20 for use of the ramp of the present invention.

Figure 13:
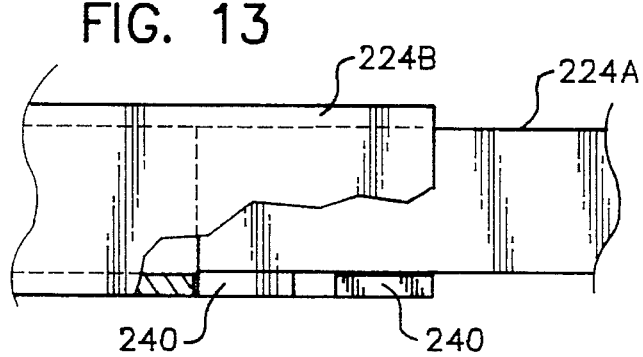
FIG. 13 is partial view of the slide stop of the tailgate ramp of FIG. 9.

Referring to FIGS. 10 and 13, left ramp 224 includes a first left member 224A slidably attached to a second left member 224B, and a right member 226 including a first right member 226A slidably attached a second left member 226B. The first left and right members 224A and 226A each have a pull handle 225 formed therein to facilitate positioning of the first members within the second members as described above with respect to ramp frame 0 and 110. Slide stops 240 are provided on the ramp members to prevent separation therebetween, also as previously shown above. Slide stops 240 are comprised of a first plate welded to the bottom of an extending ramp (i.e., first left member 224A) and a second plate welded to the bottom of a stationary ramp (i.e., second left member 224B) whereby the second plate blocks the first plate to limit extension of the extending ramp.

Figure 14:
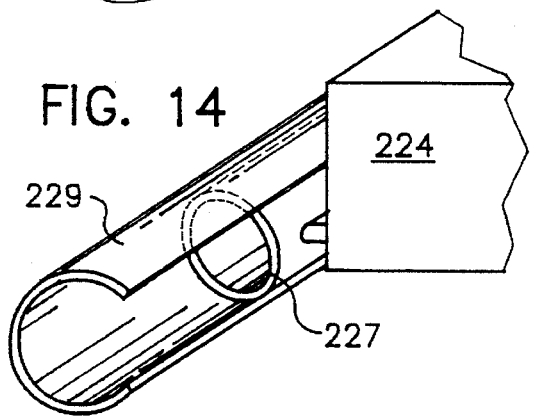
FIG. 14 is partial perspective view of the slide guide of the tailgate ramp of FIG. 9.

Referring to FIG. 14, left ramp 224 and right ramp 226 are each attached to slides 227. Each slide 227 is slidably disposed within slide guide 229 when slide guide 229 is aligned with pivot arm 22 when pivot arm 212 has been pivoted outwardly to the outer, longitudinal edge of ramp frame 210 for use of the ramps of the present invention. The above alignment of pivot arm 212 and slide guide 229 allows lateral movement of the ramps with respect to each other along slides 227 to adapt to vehicles having different wheel bases.

Figure 15:
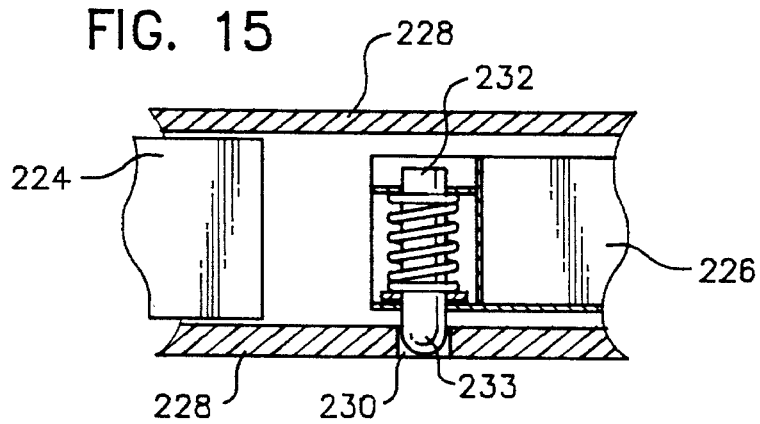
FIG. 15 is partial cutaway view of the push button lock of the tailgate ramp of FIG. 9.

Referring to FIG. 10 and FIG. 15, the left ramp 224 and right ramp 226 are joined by a hollow latch arm 228 on left ramp 224 and push button lock 232 on right ramp 224 that fits within hollow latch arm 228 to form a single ramp. Lock 232 includes a spring biased button 233 projecting through an opening 230 in hollow latch arm 228 that must be pushed to separate the ramp members.

Figure 17:
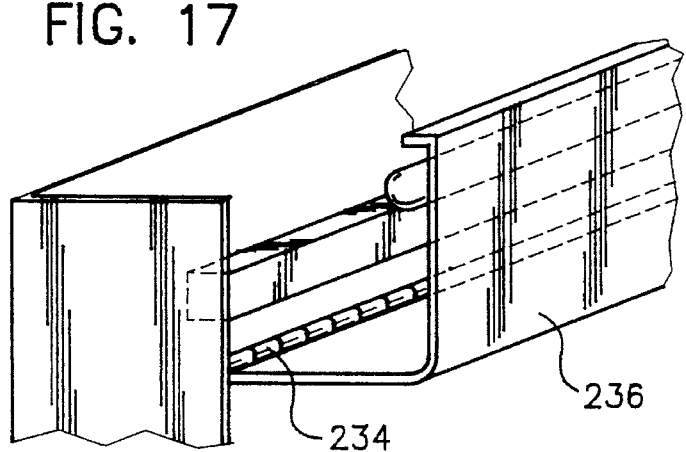
FIG. 17 is partial perspective view of the tailgate cover of the tailgate ramp of FIG. 9.
Figure 18:
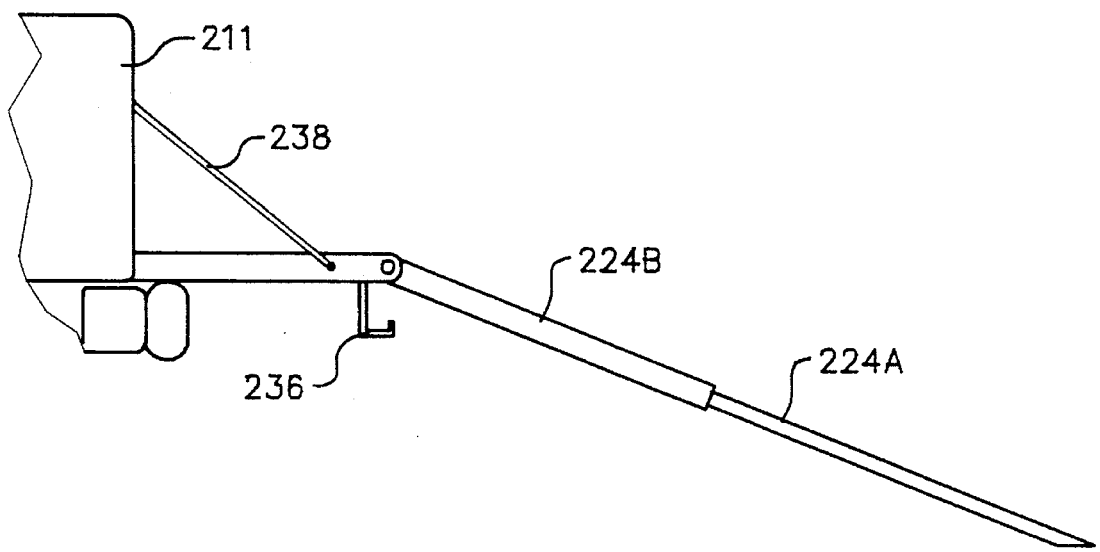
FIG. 18 is side elevational view of the tailgate ramp of FIG. 9 with ramps extended.

Referring now to FIGS. 17 and 18 in conjunction with FIGS. 9 and 10, tailgate cover 236 is pivotally attached to ramp frame 210 by a hinge 234. Cover 236 prevents foreign articles from collecting within the interior of ramp frame 210. Support cables 238 are attached at one end to the truck body 21 and at the other end to ramp frame 20 to provide additional support of ramp frame 20 when ramp frame 210 is placed in an open position as shown in FIG. 18.

It will be understood that each of the elements described above, or two or more together, may also find a useful application in other types of constructions differing from the type described above.

While the invention has been illustrated and described as embodied in a tailgate ramp for a pickup truck, it is not intended to be limited to the details shown, since it will be understood that various omissions, modifications, substitutions and changes in the forms and details of the device illustrated and in its operation can be made by those skilled in the art without departing in any way from the spirit of the present invention.

I claim:

1. A tailgate ramp for a vehicle with a substantially horizontal bed, comprising:

a frame having a width and length;

means for pivotally mounting the frame to the vehicle;

at least one support member within the frame;

vertical sliding means mounted to the at least one support member for movement of the at least one support member within the frame and along the width of the frame;

at least one ramp member attached to the support member and adapted to support a second vehicle thereon, the at least one ramp member having at least two telescoping members having extended and retracted configurations, wherein the at least one ramp member is dimensioned to be completely disposed within the frame when the at least two telescoping members are in the retracted configuration; and horizontal sliding means connected to the at least one support member and fixedly attached to one of telescoping members of the at least one ramp member for permitting movement of the at least one ramp member along the length of the frame wherein the at least one support member is configured for pivotal movement of the at least one ramp member in a vertical plane substantially perpendicular to the substantially horizontal bed of the vehicle.

2. The tailgate ramp as described in claim 1 wherein the means for pivotally mounting the frame to the vehicle is a hinge assembly.

3. The tailgate ramp as described in claim 1 wherein the at least one support member is at least one axle.

4. The tailgate ramp as described in claim 3 wherein the vertical sliding means is a pair of roller members rotatably mounted to opposite ends of the at least one axle.

5. The tailgate ramp as described in claim 4 wherein the horizontal sliding means is at least one sleeve slidably disposed around the at least one axle.

6. The tailgate ramp as described in claim 3 wherein the at least one axle is a left axle and a right axle.

7. The tailgate ramp as described in claim 6 wherein the at least one ramp member is a left ramp member mounted to the left axle, and a right ramp member mounted to the right axle.

8. The tailgate ramp as described in claim 7 wherein one of the left ramp member and the right ramp member has a width that increases with distance from the frame when in the extended configuration and the other of the left ramp member and the right ramp member has a width that decreases with distance from the frame when in the extended configuration to form a substantially rectangular ramp.

9. A tailgate ramp for a vehicle with a substantially horizontal bed, comprising:

a frame having a width and a length;

a hinge assembly mounted to the frame and to the vehicle;

at least one axle within the frame;

vertical sliding means mounted to the at least one axle for permitting movement of the at least one axle within the frame and along the width of the frame;

at least one ramp member attached to the axle and adapted to support a second vehicle thereon, the at least one ramp member having at least two telescoping members having extended and retracted configurations, wherein the at least one ramp member is dimensioned to be completely disposed within the frame when the at least two telescoping members are in the retracted configuration; and horizontal sliding means slidably connected to the at least one axle and fixedly attached to one of the telescoping members of the at least one ramp member for permitting movement of the at least one ramp member along the length of the frame wherein the at least one support member is configured for pivotal movement of the at least one ramp member in a vertical plane substantially perpendicular to the substantially horizontal bed of the vehicle.

10. The tail gate as described in claim 9 wherein the horizontal sliding means is at least one sleeve slidably disposed around the at least one axle.

11. The tailgate ramp as described in claim 10 wherein the vertical sliding means is a pair of roller members rotatably mounted to opposite ends of the at least one axle.

12. The tailgate ramp as described in claim 11 wherein the at least one axle is a left axle and a right axle.

13. The tailgate ramp as described in claim 12 wherein the at least one ramp member is a left ramp member mounted to the left axle, and a right ramp member mounted to the right axle.

14. The tailgate ramp as described in claim 13 further including means mounted to at least one of the left ramp member and the right ramp member for selectively securing the left ramp member to the right ramp member to form one ramp member.

15. The tailgate ramp as described in claim 13 wherein one of the left ramp member and the right ramp member has a width that increases with distance from the frame when in the extended configuration and the other of the left ramp member and the right ramp member has a width that decreases with distance from the frame when in the extended configuration to form a substantially rectangular ramp.

16. A tailgate ramp for a vehicle, comprising:

a frame a width and length;

means for pivotally mounting the frame to the vehicle;

at least one support member within the frame;

vertical sliding means mounted to the at least one support member for movement of the at least one support member within the frame and along the width of the frame;

at least left and right ramp members attached to the support member and adapted to support a second vehicle thereon, the at least left and right ramp members each having at least two telescoping members having extended and retracted configurations, wherein the at least left and right ramp members are dimensioned to be completely disposed within the frame when the at least two telescoping members are in the retracted configuration; and horizontal sliding means connected to the at least one support member and fixedly attached to one of telescoping members of each of the at least left and right ramp members for permitting movement of the at least left and right ramp members along the length of the frame wherein one of the left ramp member and the right ramp member has a width that increases with distance from the frame when in the extended configuration and the other of the left ramp member and the right ramp member has a width that decreases with distance from the frame when in the extended configuration to form a substantially rectangular ramp.

17. The tailgate ramp as described in claim 16 wherein the means for pivotally mounting the frame to the vehicle is a hinge assembly.

18. The tailgate ramp as described in claim 16 wherein the at least one support member is at least one axle.

19. The tailgate ramp as described in claim 18 wherein the vertical sliding means is a pair of roller members rotatably mounted to opposite ends of the at least one axle.

20. The tailgate ramp as described in claim 19 wherein the horizontal sliding means is at least one sleeve slidably disposed around the at least one axle.

21. The tailgate ramp as described in claim 19 wherein the at least one axle is a left axle and a right axle.

\* \* \* \* \*